(12) United States Patent
Liu et al.

(10) Patent No.: US 11,035,796 B2
(45) Date of Patent: Jun. 15, 2021

(54) RAMAN SPECTRUM DETECTION APPARATUS AND METHOD

(71) Applicant: NUCTECH COMPANY LIMITED, Beijing (CN)

(72) Inventors: Haihui Liu, Beijing (CN); Hongqiu Wang, Beijing (CN); Jianhong Zhang, Beijing (CN)

(73) Assignee: NUCTECH COMPANY LIMITED, Beijing (CN)

(*) Notice: Subject to any disclaimer, the term of this patent is extended or adjusted under 35 U.S.C. 154(b) by 0 days.

(21) Appl. No.: 16/314,311

(22) PCT Filed: Dec. 19, 2018

(86) PCT No.: PCT/CN2018/122054
§ 371 (c)(1),
(2) Date: Dec. 28, 2018

(87) PCT Pub. No.: WO2019/128799
PCT Pub. Date: Jul. 4, 2019

(65) Prior Publication Data
US 2020/0319112 A1     Oct. 8, 2020

(30) Foreign Application Priority Data
Dec. 26, 2017  (CN) .......................... 201711442675.1

(51) Int. Cl.
*G01J 3/44* (2006.01)
*G01N 21/65* (2006.01)
(Continued)

(52) U.S. Cl.
CPC ............ *G01N 21/65* (2013.01); *G01J 3/0205* (2013.01); *G01J 3/10* (2013.01); *G01J 3/44* (2013.01)

(58) Field of Classification Search
CPC .......... G01N 21/65; G01N 2201/1056; G01N 2201/1045; G01J 3/0205; G01J 3/10;
(Continued)

(56) References Cited

U.S. PATENT DOCUMENTS

| 4,707,836 A | 11/1987 | Travis |
| 2007/0132994 A1 | 6/2007 | Kobayashi et al. |

(Continued)

FOREIGN PATENT DOCUMENTS

| CN | 105765372 A | 7/2016 |
| CN | 106226282 A | 12/2016 |

(Continued)

OTHER PUBLICATIONS

European Patent Application No. 18826178.8; Extended Search Report; dated May 14, 2020; 7 pages.

*Primary Examiner* — Abdullahi Nur
(74) *Attorney, Agent, or Firm* — BakerHostetler

(57) ABSTRACT

The present disclosure provides Raman spectrum detection apparatus and method. The Raman spectrum detection apparatus includes: a laser configured for emitting excited light; an optics assembly configured to guide the excited light along a first light path to a sample to be detected and to collect a light signal from the sample along a second light path; and a spectrometer configured to process the light signal collected by the optics assembly so as to generate a Raman spectrum of the detected sample. The optics assembly includes a first optical element configured to move, during irradiation of the excited light onto the sample, so as to change a position of a light spot of the excited light on the sample.

20 Claims, 3 Drawing Sheets

(51) Int. Cl.
*G01J 3/02* (2006.01)
*G01J 3/10* (2006.01)

(58) Field of Classification Search
CPC .......... G01J 3/44; G01J 3/06; G01J 2003/064; G01J 3/0237; G01J 3/02; G02B 26/108
See application file for complete search history.

(56) References Cited

U.S. PATENT DOCUMENTS

| | | | |
|---|---|---|---|
| 2007/0177256 A1* | 8/2007 | Fukuyama | ........... G02B 27/646 |
| | | | 359/379 |
| 2009/0021724 A1 | 1/2009 | Mahadevan-Jansen et al. | |
| 2014/0104611 A1* | 4/2014 | Watson | ................. G01N 21/65 |
| | | | 356/326 |
| 2015/0131091 A1 | 5/2015 | Smith et al. | |
| 2017/0003226 A1 | 1/2017 | Parker | |

FOREIGN PATENT DOCUMENTS

| | | |
|---|---|---|
| CN | 206479455 U | 9/2017 |
| CN | 107328755 A | 11/2017 |
| CN | 107884389 A | 4/2018 |
| CN | 207779899 U | 8/2018 |
| EP | 2078953 A2 | 7/2009 |

\* cited by examiner

RAMAN SPECTRUM DETECTION APPARATUS AND METHOD

CROSS-REFERENCE TO RELATED APPLICATIONS

This application is the National Stage of International Application No. PCT/CN2018/122054, filed Dec. 19, 2018, which claims the priority of the Chinese Patent Application No. 201711442675.1 filed on Dec. 26, 2017, the whole disclosures of which are incorporated herein by reference.

TECHNICAL FIELD

Embodiments of the present disclosure generally relate to the field of Raman spectrum detection, and particularly, to a Raman spectrum detection apparatus and a method of detection a sample.

DESCRIPTION OF THE RELATED ART

Raman spectrum analysis technology is a non-contact spectrum analysis technology based on Raman scattering effect, which can qualitatively and/or quantitatively analyze the composition of a substance. Raman spectrum is a molecular vibration spectrum that can represent the fingerprint characteristics of molecules, and can be used for the inspection of substance. Raman spectrometer can inspect and identify the substance by the Raman spectrum generated by the Raman scattering effect of the object to be inspected induced by the excited light. Raman spectrum detection technology has been widely used in the fields of liquid detection, jewelry detection, explosive detection, drug detection, drugs detection and the like.

In applications of the Raman spectrum analysis technologies, there are multifarious objects to be detected, and various substances therein have different physical characteristics and thereby have different thermal sensitivity to laser irradiation used in Raman spectrum analysis technology. Laser having a high power density is generally used as an excited light source in Raman spectrum detection, for example, near infrared laser light of 785 nm has a stronger thermal effect, thus in case that components of a sample to be detected are not known, a rushed detection may possibly cause the sample to be burned and damaged by the laser light, and even lead to burning or exploding some flammable or explosive chemicals by the laser light, resulting in personal and property loss.

SUMMARY

The present disclosure is made to at least partly solve or alleviate at least one aspect of the above mentioned and other disadvantages or problems in prior art.

According to an aspect of the present disclosure, there is provided a Raman spectrum detection apparatus, comprising:

a laser configured for emitting excited light;

an optics assembly configured to guide the excited light along a first light path to a sample to be detected and to collect a light signal from the sample along a second light path; and a spectrometer configured to process the light signal collected by the optics assembly so as to generate a Raman spectrum of the sample being subjected to detection, the optics assembly comprises a first optical element configured to move, during irradiation of the excited light onto the sample, so as to change a position of a light spot of the excited light on the sample.

In one embodiment, the first optical element is further configured to be rotated about an axis so as to guide the light spot of the excited light irradiated onto the sample to move along a substantially annular trajectory on the sample.

In one embodiment, the first optical element is further configured to be moved along the axis so as to change a radius of the substantially annular trajectory of the light spot on the sample.

In one embodiment, the first optical element is further configured to be rotated about the axis while being moved along the axis so as to guide the light spot to move along a substantially spiral trajectory on the sample.

In one embodiment, the Raman spectrum detection apparatus further comprises a driving mechanism configured to drive the first optical element to rotate about the axis and/or to move along the axis.

In one embodiment, the axis passes through a center of the first optical element.

In some embodiments, a part of the first light path is coaxial with the second light path, the first optical element is disposed in the second light path between the laser and the sample, and the axis is parallel to the second light path; or the first light path and the second light path are off-axial, the first optical element is disposed in the first light path, and the axis is parallel to a part of the first light path routing from the laser to the first optical element.

In one embodiment, the first optical element includes an optical wedge.

According to another aspect of the present disclosure, there is provided a method of detecting a sample by using the Raman spectrum detection apparatus described in any of embodiments of the present disclosure, the method comprising steps of: emitting the excited light by the laser and guiding the excited light by the optics assembly to the sample; changing the position of the light spot of the excited light irradiated on the sample by a movement of the first optical element; and collecting, by the spectrometer, a light signal generated by the sample under irradiation of the excited light so as to form a Raman spectrum of the sample.

In one embodiment, the step of changing the position of the light spot of the excited light irradiated on the sample by a movement of the first optical element is performed continuously during irradiation of the excited light onto the sample, or performed intermittently at a time interval during the irradiation of the excited light onto the sample.

In one embodiment, the step of changing the position of the light spot of the excited light irradiated on the sample by a movement of the first optical element comprises: rotating the first optical element to guide the light spot of the excited light irradiated on the sample to move along a substantially annular trajectory on the sample.

In one embodiment, the method further comprises moving the first optical element along the axis while rotating the first optical element, so as to change a radius of the substantially annular trajectory of the light spot on the sample.

In one embodiment, the light spot is guided by the first optical element to move along a substantially spiral trajectory on the sample while the excited light is irradiated onto the sample.

Other objects and advantages of the present disclosure will become apparent from the following description of the present disclosure taken in conjunction with the accompanying drawings, and may give a comprehensive understanding of the present disclosure.

BRIEF DESCRIPTION OF THE DRAWINGS

The above and other features and advantages of the present disclosure will become more apparent with reference to the accompanying drawings, which are schematic and should not be interpreted as being limitative to the present disclosure, and in which.

DETAILED DESCRIPTION OF EXEMPLARY EMBODIMENTS

Figure 1:
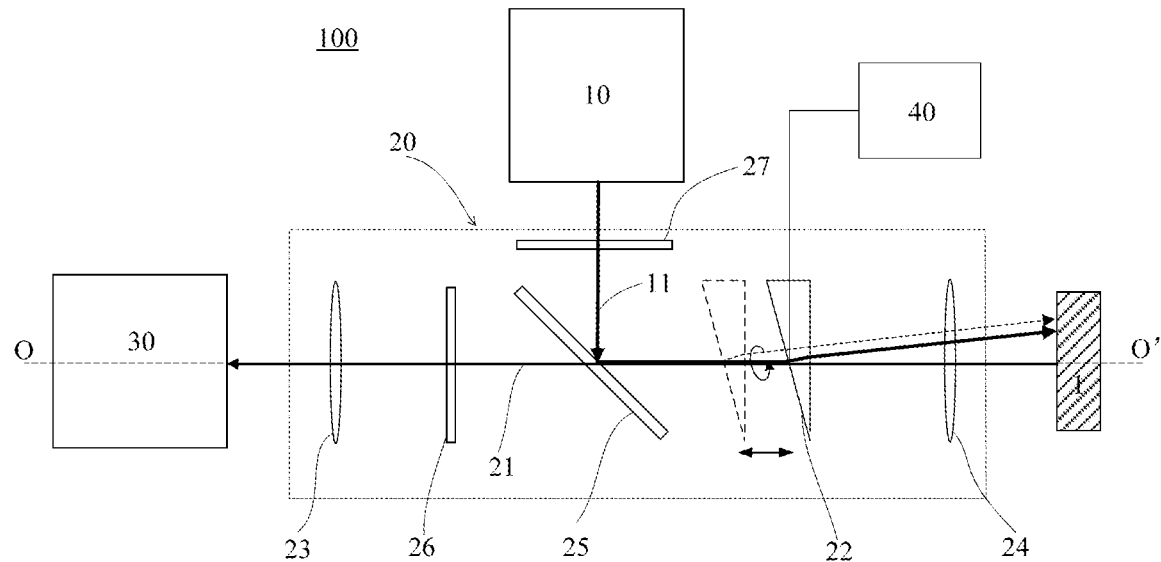
FIG. 1 is a schematic diagram showing an arrangement of a Raman spectrum detection apparatus according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 schematically shows an arrangement of a Raman spectrum detection apparatus according to an exemplary embodiment of the present disclosure. As shown in the Figure, a Raman spectrum detection apparatus 100 comprises: a laser 10 configured for emitting excited light 11; an optics assembly 20 configured to guide the excited light 11 to a sample 1 to be detected and to collect a light signal from the sample 1; and a spectrometer 30 configured to process the light signal collected by the optics assembly 20 so as to generate a Raman spectrum of the detected sample 1 under irradiation of the excited light. As an example, the Raman spectrum of the sample generated by the spectrometer may be compared with a Raman spectrum of a known substance, so that the components of the sample may be determined. This comparison may be achieved by for example a computer or processor.

During the Raman spectrum detection, it will generally face a security issue where a temperature of the sample is increased due to absorbing heat during irradiation of the laser light onto the sample, which thereby may result in ablation, or even burning or exploding of the detected sample. In embodiments of the present disclosure, a position of a light spot of the excited light on the sample is guided and changed by using an optical element, such that the excited light impinges onto the sample in such a way that a position at which the excited light impinges onto the sample is changeable, rather than in a single-point and static way, so as to avoid overheating at a certain position on the sample, thereby degradation, ablation, burning or even exploding of the detected sample, caused due to too high laser power density, may be avoided during the Raman spectrum detection, thereby decreasing risks during the detection.

Figure 2:
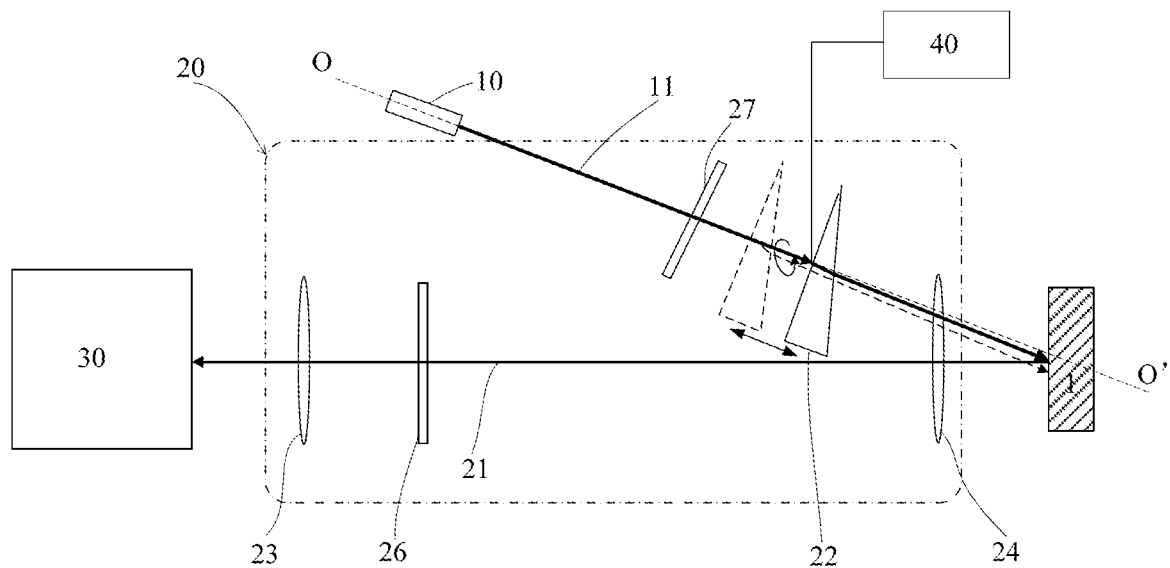
FIG. 2 is a schematic diagram showing an arrangement of a Raman spectrum detection apparatus according to another exemplary embodiment of the present disclosure.

In an embodiment, as shown in FIGS. 1 and 2, the optics assembly comprises a first optical element 22 configured to move, during irradiation of the excited light 11 onto the sample 1, so as to change a position of a light spot of the excited light on the sample, as indicated by a dashed arrow shown in the Figures, thereby heat can be prevented from being accumulated or built up at a certain position on the sample. It will be understood that the first optical element can have various specific forms for changing the position of the light spot on the sample, and in some example, the first optical element may include a prism, for example, an optical wedge.

Figure 3:
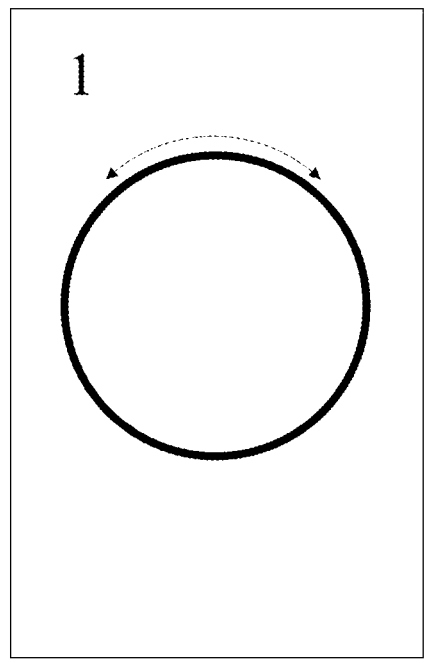
FIG. 3 is a schematic diagram showing a movement trajectory of a light spot generated on a sample by a Raman spectrum detection apparatus according to an exemplary embodiment of the present disclosure.

In an example, as shown in FIGS. 1 and 2, the first optical element 22 is rotatable about an axis O-O' so as to guide the light spot of the excited light 11 to irradiate onto the sample in a non-concentrated way, so as to move (clockwise or counterclockwise) on the sample, for example along a substantially annular trajectory, as shown in FIG. 3, thereby laser energy is dispersed on the sample so as to avoid overheating or damage of the sample otherwise caused due to conventional single-point and static irradiation. Further, with rotation of the first optical element about the axis so as to change the position of the light spot of the excited light on the sample, it enables relatively stable light path system and can avoid undulation in light path otherwise caused due to movement of other optical elements.

It will be understood that the movement trajectory of light spot of the excited light on the sample is not limited to the substantially annular trajectory, and other straight or curved trajectory may be adopted to avoid heat from being accumulated or built up at a certain position on the sample. In embodiments of the present disclosure, the light spot of the excited light may be moved or scanned along a substantially annular trajectory on the sample, thereby effectively avoiding heat from being accumulated on the sample otherwise caused due to repeated scanning.

Figure 4:
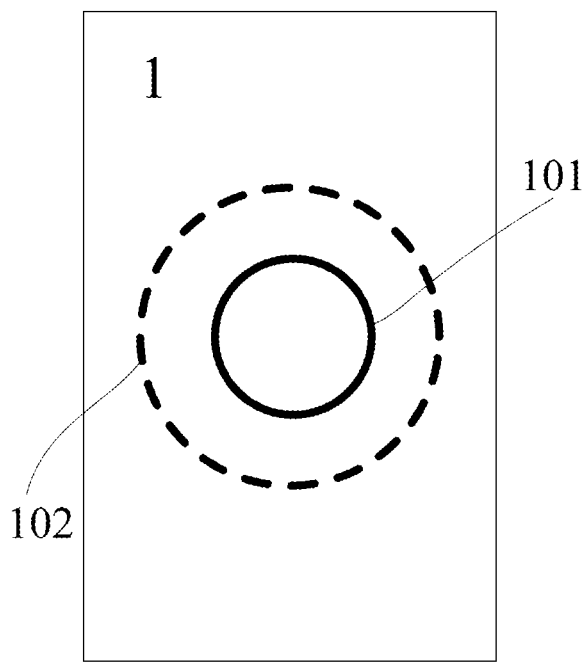
FIG. 4 is a schematic diagram showing a movement trajectory of a light spot generated on a sample by a Raman spectrum detection apparatus according to another exemplary embodiment of the present disclosure.

In another example, the first optical element 22 may also be moved axially or be translated, for example, may be moved along the axis O-O' (in a unidirectional, bidirectional, reciprocating way), as indicated by a bidirectional arrow shown in FIGS. 1 and 2, such that a position of the first optical element 22 on the axis varies, so as to change a radius of the substantially annular trajectory of the light spot of the excited light 11 on the sample 1, as indicated by the substantially annular trajectories 101, 102 shown in FIG. 4. Exemplarily, in the embodiments shown in FIGS. 1 and 2, the radius of the trajectory of the light spot on the sample 1 is reduced when the first optical element 22 is moved towards the sample 1 along the axis O-O', and is increased when the first optical element 22 is moved away from the sample 1 along the axis O-O'.

Figure 5:
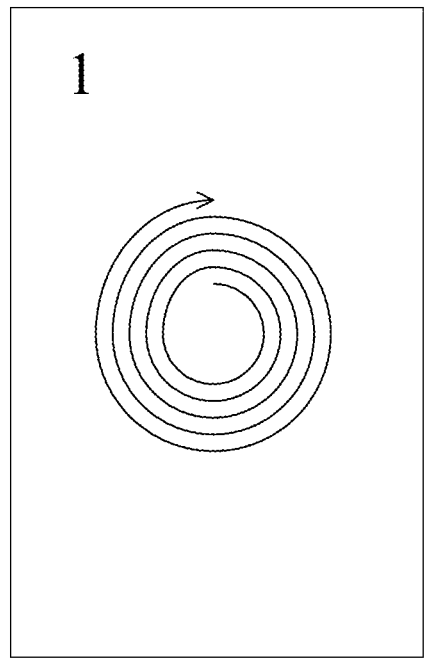
FIG. 5 is a schematic diagram showing a movement trajectory of a light spot generated on a sample by a Raman spectrum detection apparatus according to a further exemplary embodiment of the present disclosure.
Figure 6:
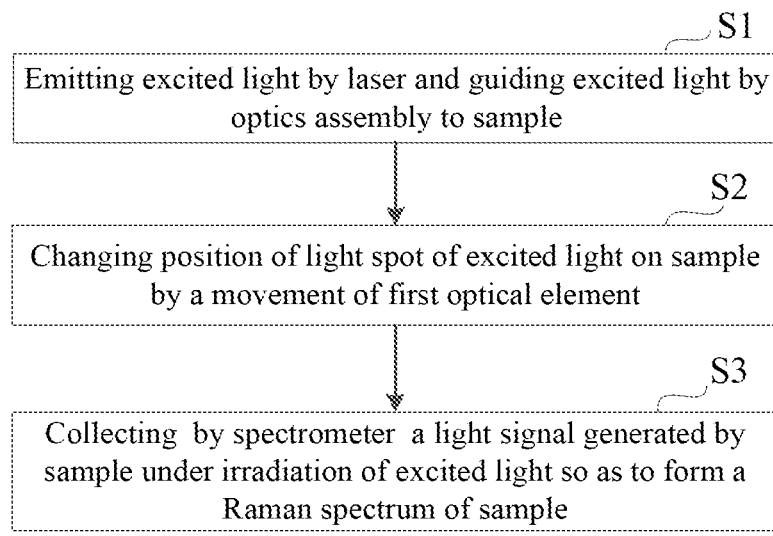
FIG. 6 is a flow chart showing a method of detecting a sample by a Raman spectrum detection apparatus according to an exemplary embodiment of the present disclosure.

In an exemplary embodiment of the present disclosure, the first optical element 22 is configured to be rotated about the axis O-O' while being moved or translated along the axis so as to guide the light spot of the excited light to move and scan along a substantially spiral trajectory on the sample, as shown in FIG. 5, thereby the laser energy may be more effectively dispersed and accumulation of heat on the sample is decreased.

As shown in FIGS. 1 and 2, the Raman spectrum detection apparatus may further comprise a driving mechanism 40, which may drive the first optical element 22 to rotate about the axis O-O' and/or to move along the axis O-O'. Specific form of the driving mechanism is not particularly limited herein, and in an example, includes a motor.

In an example, the axis O-O' extends and passes through a center of the first optical element 22, thereby the first optical element may be rotated or translated relative to the axis more stably, and the trajectory of the light spot on the sample may be more uniformly distributed. In the illustrated embodiment, the optics assembly 20 guides the excited light 11 along a first light path (as indicated by a heavy solid line shown in the Figure) to the sample 1, and guides a light signal from the sample 1 along a the second light path 21 to the spectrometer 30. In FIG. 1, a part of the first light path is coaxial with the second light path 21, the first optical element 22 is disposed in the second light path 21, or in the part of the first light path coaxial with the second light path 21, between the laser 10 and the sample 1 (specifically, between the beam splitter 25 and the sample 1), and the axis O-O' is parallel to the second light path 21. In this case, the axis O-O' may extend and pass through centers of the first optical element 22 and the sample 1. In an alternative embodiment shown in FIG. 2, the first light path and the second light path 21 are off-axial or separated from each other, the first light path extends from the laser 10 to the sample 1, the first optical element 22 is disposed in the first light path, and the axis O-O' is parallel to a part of the first light path between the laser and the first optical element, for example, the axis O-O' extends and passes through centers of the first optical element 22 and the sample 1.

In some embodiments, as shown in FIGS. 1 and 2, the optics assembly 20 may establish or form a light path 21, for collecting the light signal (including a Raman light component) from the sample 1 or guiding the signal to the spectrometer. In the exemplary embodiment shown in FIG. 1, a convergent lens 23 located at a position close to the spectrometer 30, a convergent lens 24 located at a position close to the sample 1, a beam splitter 25 located between the convergent lenses 23 and 24, and a long-pass filter or notch filter 26 are disposed in the light path 21. The first optical element 22 is disposed in the light path 21 between the beam splitter 25 and the sample 1 (for example, between the beam splitter 25 and the convergent lens 24). The convergent lens 24 is used for focusing the excited light 11 onto the sample 1 and collecting the light signal from the sample 1. The beam splitter 25 is used for guiding (for example, reflecting) the excited light 11 from the laser 10 towards the first optical element 22 and the convergent lens 24, and for transmitting therethrough at least a part of the light signal from the sample 1 to the spectrometer 30. The long-pass filter or notch filter 26 is used for filtering out Rayleigh light from the light signal having passed through the beam splitter 25. The convergent lens 23 is used for focusing the light from the sample onto the spectrometer 30 (for example, onto a detector of the spectrometer). In addition, other optical element 27, such as a collimating lens and/or a narrow band filter, may be provided in the excited light path from the laser 10 to the sample, the collimating lens may be used for collimating the excited light into parallel light so as to improve directionality and optical efficiency, and the narrow band filter may be used for removing inferences so as to improve a signal-to-noise ratio of the excited light within a desired wavelength band.

An embodiment of the present disclosure further provides a method of detecting a sample by using the Raman spectrum detection apparatus described in any of the embodiments of the present disclosure. Referring to FIG. 1-6, the method may include following steps:

S1: emitting the excited light 11 by the laser 10 and guiding the excited light by the optics assembly to the sample 1;

S2: changing the position of the light spot of the excited light irradiated on the sample 1 by a movement of the first optical element 22; and S3: collecting, by the spectrometer 30, a light signal generated by the sample 1 under irradiation of the excited light so as to form a Raman spectrum of the sample.

In some examples, the step of changing the position of the light spot of the excited light irradiated on the sample by a movement of the first optical element may be performed continuously during irradiation of the excited light onto the sample, or performed intermittently at a time interval during the irradiation of the excited light onto the sample, as described above, or may be selectively performed according to a safety status of the sample under the irradiation of the laser light.

In an example, in the step S1, the first optical element 22 may be driven to rotate about the axis O-O' so as to guide the light spot of the excited light 11 irradiated on the sample to move along a substantially annular trajectory on the sample 1. In other examples, the first optical element 22 may be driven to move or translate along the axis O-O' while rotating about the axis so as to change a radius of the substantially annular trajectory of the light spot on the sample, such that for example the light spot moves along a substantially spiral trajectory on the sample.

In the embodiments of the present disclosure, the position of the light spot of the excited light on the sample is guided and changed by using the optical element, such that the excited light impinges onto the sample in such a way that a position at which the excited light impinges onto the sample is changeable, rather than in a single-point and static way, so as to avoid overheating at a certain position on the sample, thereby degradation, ablation, burning or even exploding of the detected sample, otherwise caused due to too high laser power density, may be avoided during the Raman spectrum detection, risks during the detection are decreased, thereby ensuring safety of the sample and an operator during using the Raman spectrometer.

Although several exemplary embodiments of the present disclosure have been shown and described, it would be appreciated by those skilled in the art that various changes or modifications may be made in form and detail in these embodiments without departing from the principles and spirit of the present disclosure, the scope of which is defined in the claims and their equivalents.

What is claimed is:

1. A Raman spectrum detection apparatus, comprising:
   a laser configured for emitting excited light;
   an optics assembly configured to guide the excited light along a first light path to a sample to be detected and to collect a light signal from the sample along a second light path;

a spectrometer configured to process the light signal collected by the optics assembly so as to generate a Raman spectrum of the sample being subjected to detection;

wherein the optics assembly comprises a first optical element configured to move, during irradiation of the excited light onto the sample, so as to change a position of a light spot of the excited light on the sample; and wherein the first light path and the second light path are off-axial, such that the first light path is separated from the second light path, and the first optical element is only disposed in the first light path.

2. The Raman spectrum detection apparatus according to claim 1, wherein the first optical element is further configured to be rotated about an axis so as to guide the light spot of the excited light irradiated onto the sample to move along a substantially annular trajectory on the sample.

3. The Raman spectrum detection apparatus according to claim 2, wherein the first optical element is further configured to be moved along the axis so as to change a radius of the substantially annular trajectory of the light spot on the sample.

4. The Raman spectrum detection apparatus according to claim 2, wherein the first optical element is further configured to be rotated about the axis while being moved along the axis so as to guide the light spot to move along a substantially spiral trajectory on the sample.

5. The Raman spectrum detection apparatus according to claim 2, further comprising a driving mechanism configured to drive the first optical element to rotate about the axis and/or to move along the axis.

6. The Raman spectrum detection apparatus according to claim 2, wherein the axis passes through a center of the first optical element.

7. The Raman spectrum detection apparatus according to claim 2, wherein the axis is parallel to a part of the first light path routing from the laser to the first optical element.

8. The Raman spectrum detection apparatus according to claim 1, wherein the first optical element includes an optical wedge.

9. A method of detecting a sample by using the Raman spectrum detection apparatus of claim 1, the method comprising steps of:
emitting the excited light by the laser and guiding the excited light by the optics assembly to the sample along the first light path;
changing the position of the light spot of the excited light irradiated on the sample by a movement of the first optical element that is only disposed in the first light path; and
collecting, by the spectrometer, a light signal generated by the sample under irradiation of the excited light so as to form a Raman spectrum of the sample.

10. The method according to claim 9, wherein the step of changing the position of the light spot of the excited light irradiated on the sample by a movement of the first optical element is performed continuously during irradiation of the excited light onto the sample, or performed intermittently at a time interval during the irradiation of the excited light onto the sample.

11. The method according to claim 9, wherein the step of changing the position of the light spot of the excited light irradiated on the sample by a movement of the first optical element comprises:
rotating the first optical element to guide the light spot of the excited light irradiated on the sample to move along a substantially annular trajectory on the sample.

12. The method according to claim 11, further comprising:
moving the first optical element along the axis while rotating the first optical element, so as to change a radius of the substantially annular trajectory of the light spot on the sample.

13. The method according to claim 11, wherein the light spot is guided by the first optical element to move along a substantially spiral trajectory on the sample while the excited light is irradiated onto the sample.

14. The Raman spectrum detection apparatus according to claim 3, wherein the first optical element is further configured to be rotated about the axis while being moved along the axis so as to guide the light spot to move along a substantially spiral trajectory on the sample.

15. The Raman spectrum detection apparatus according to claim 14, further comprising a driving mechanism configured to drive the first optical element to rotate about the axis and/or to move along the axis.

16. The Raman spectrum detection apparatus according to claim 3, wherein
a part of the first light path is coaxial with the second light path, the first optical element is disposed in the second light path between the laser and the sample, and the axis is parallel to the second light path; or
the first light path and the second light path are off-axial, the first optical element is disposed in the first light path, and the axis is parallel to a part of the first light path routing from the laser to the first optical element.

17. The Raman spectrum detection apparatus according to claim 4, wherein
a part of the first light path is coaxial with the second light path, the first optical element is disposed in the second light path between the laser and the sample, and the axis is parallel to the second light path; or
the first light path and the second light path are off-axial, the first optical element is disposed in the first light path, and the axis is parallel to a part of the first light path routing from the laser to the first optical element.

18. The method according to claim 10, wherein the step of changing the position of the light spot of the excited light irradiated on the sample by a movement of the first optical element comprises:
rotating the first optical element to guide the light spot of the excited light irradiated on the sample to move along a substantially annular trajectory on the sample.

19. The method according to claim 18, further comprising:
moving the first optical element along the axis while rotating the first optical element, so as to change a radius of the substantially annular trajectory of the light spot on the sample.

20. The method according to claim 19, wherein the light spot is guided by the first optical element to move along a substantially spiral trajectory on the sample while the excited light is irradiated onto the sample.

* * * * *